(12) United States Patent
Nakashima

(10) Patent No.: US 12,528,895 B2
(45) Date of Patent: Jan. 20, 2026

(54) RUBBER COMPOSITION

(71) Applicant: COMPAGNIE GENERALE DES ETABLISSEMENTS MICHELIN, Clermont-Ferrand (FR)

(72) Inventor: Yasufumi Nakashima, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 574 days.

(21) Appl. No.: 17/795,392

(22) PCT Filed: Jan. 28, 2021

(86) PCT No.: PCT/JP2021/002941
§ 371 (c)(1),
(2) Date: Jul. 26, 2022

(87) PCT Pub. No.: WO2021/153643
PCT Pub. Date: Aug. 5, 2021

(65) Prior Publication Data
US 2023/0068320 A1    Mar. 2, 2023

(30) Foreign Application Priority Data
Jan. 28, 2020    (WO) .................. PCT/JP2020/002898

(51) Int. Cl.
| C08F 36/06 | (2006.01) |
| B60C 1/00 | (2006.01) |
| C08F 36/08 | (2006.01) |
| C08K 3/04 | (2006.01) |
| C08K 3/36 | (2006.01) |
| C08K 5/5419 | (2006.01) |
| C08K 7/02 | (2006.01) |
| C08K 9/08 | (2006.01) |

(52) U.S. Cl.
CPC ............ *C08F 36/06* (2013.01); *B60C 1/0025* (2013.01); *C08F 36/08* (2013.01); *C08K 3/04* (2013.01); *C08K 3/36* (2013.01); *C08K 5/5419* (2013.01); *C08K 7/02* (2013.01); *C08K 9/08* (2013.01); *C08K 2201/004* (2013.01)

(58) Field of Classification Search
CPC . C08F 36/06; C08F 36/08; C08K 3/04; C08K 3/36; C08K 5/5419; C08K 7/02; C08K 9/08; B60C 1/00
USPC ........................................................ 523/156
See application file for complete search history.

(56) References Cited

U.S. PATENT DOCUMENTS

| 5,852,097 | A | 12/1998 | Kikuchi |
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 7,300,970 | B2 | 11/2007 | Durel et al. |
| 7,488,768 | B2 | 2/2009 | Tardivat et al. |
| 7,491,767 | B2 | 2/2009 | Durel et al. |
| 8,492,475 | B2 | 7/2013 | Araujo Da Silva et al. |
| 8,957,155 | B2 | 2/2015 | Seeboth et al. |
| 9,010,393 | B2 | 4/2015 | Araujo Da Silva et al. |
| 10,017,634 | B2 | 7/2018 | Miyazaki et al. |
| 2004/0051210 | A1 | 3/2004 | Tardivat et al. |
| 2004/0129360 | A1 | 7/2004 | Vidal |
| 2004/0132880 | A1 | 7/2004 | Durel et al. |
| 2005/0016650 | A1 | 1/2005 | Durel et al. |
| 2005/0016651 | A1 | 1/2005 | Durel et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2010/0145089 | A1 | 6/2010 | Mignani et al. |
| 2011/0152458 | A1 | 6/2011 | Araujo Da Silva et al. |
| 2011/0294953 | A1 | 12/2011 | Seeboth et al. |
| 2013/0184373 | A1 | 7/2013 | Miyazaki et al. |
| 2016/0340501 | A1 | 11/2016 | Miyazaki et al. |
| 2018/0134079 | A1* | 5/2018 | Miyazaki .................. C08L 1/02 |
| 2019/0003555 | A1 | 1/2019 | Ishiguro et al. |

FOREIGN PATENT DOCUMENTS

| EP | 0719820 | A1 | 7/1996 | |
| EP | 3095816 | A1 | 11/2016 | |
| EP | 3396201 | A1 | 10/2018 | |
| JP | 2009263584 | A * | 11/2009 | ........... B60C 1/0016 |
| JP | 2013-166914 | A | 8/2013 | |
| KR | 10-2009-0132059 | A | 12/2009 | |
| WO | 97/36724 | A2 | 10/1997 | |
| WO | 99/09036 | A1 | 2/1999 | |
| WO | 99/16600 | A1 | 4/1999 | |
| WO | 02/30939 | A1 | 4/2002 | |

(Continued)

OTHER PUBLICATIONS

International Search Report dated Mar. 29, 2021, in corresponding PCT/JP2021/002941 (2 pages).

(Continued)

*Primary Examiner* — Deve V Hall
(74) *Attorney, Agent, or Firm* — VENABLE LLP

(57) ABSTRACT

A rubber composition based on at least an elastomer matrix, a carbon black, a silica, a silane coupling agent and short fibers, wherein the amount in phr of the silica is higher than that of the carbon black, wherein the amount of the silane coupling agent is more than 0.0% and less than 5.0% by weight per 100% by weight of the silica, wherein the amount of the short fibers is more than 0.0 phr and less than 5.0 phr and wherein the number-average length of the short fibers is less than 10 mm.

12 Claims, 1 Drawing Sheet

(56) References Cited

FOREIGN PATENT DOCUMENTS

| WO | 02/31041 A1 | 4/2002 | | |
|---|---|---|---|---|
| WO | 02/083782 A1 | 10/2002 | | |
| WO | 03/002648 A1 | 1/2003 | | |
| WO | 03/002649 A1 | 1/2003 | | |
| WO | 2004/033548 A1 | 4/2004 | | |
| WO | 2006/023815 A2 | 3/2006 | | |
| WO | 2006/125532 A1 | 11/2006 | | |
| WO | 2006/125533 A1 | 11/2006 | | |
| WO | 2006/125534 A1 | 11/2006 | | |
| WO | 2007/098080 A2 | 8/2007 | | |
| WO | 2008/055986 A2 | 5/2008 | | |
| WO | 2010/072685 A1 | 7/2010 | | |
| WO | WO-2016199555 A1 * | 12/2016 | ............... | B60C 1/00 |
| WO | WO-2018124438 A2 * | 7/2018 | ............... | D02G 3/48 |

OTHER PUBLICATIONS

S. Brunauer, et al., "Adsorption of Gases in Multimolecular Layers", J. Am. Chem. Soc., vol. 60, pp. 309-319 (1938).

* cited by examiner

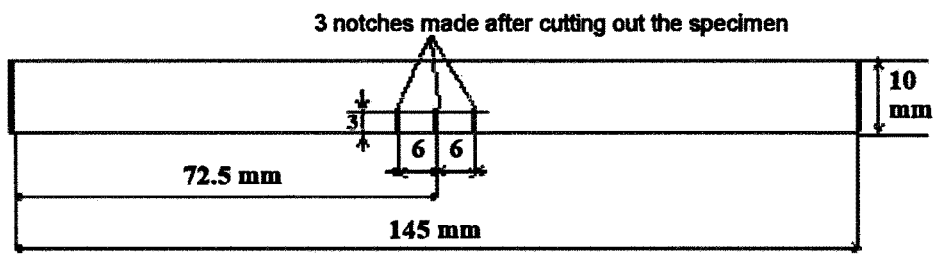

RUBBER COMPOSITION

TECHNICAL FIELD

The field of the invention is that of a rubber composition intended in particular for rubber articles, in more particular for tires, in still more particular for sidewalls of tires.

BACKGROUND

Rubber articles such as tires can be teared by continuous deformation, contact with irregularities or both.

CITATION LIST

Patent Literature

PTL 1: KR20090132059
PTL 2: JP2013-166914

The patent literature 1 discloses a rubber composition for reinforcing a sidewall of a run-flat tire, exhibiting high tensile property, by using 100 parts by weight of raw material rubber consisting of 60% by weight of natural rubber and 40% by weight of vinyl-cis rubber as a rubber-resin composition, 50 parts by weight of carbon black, 10 parts by weight of silica, 1.5 parts by weight of a silane coupling agent and 5 or 10 parts by weight of a nano-reinforcement resin as short fibers.

The patent literature 2 discloses a rubber composition for a sidewall of a pneumatic tire, achieving good elongation at break, by using 100 parts by weight of raw material rubber consisting of 60% by weight of natural rubber and 40% by weight of polybutadiene, 20 parts by weight of carbon black, 5 parts by weight of silica without any silane coupling agent and 3 parts by weight of micro fibrillated plant fibers.

A constant objective of manufacturers for rubber articles is to improve tensile tear performance that is resistance to failure due to dynamic flexing and abrasion of rubber compositions for the rubber articles.

During their research, the inventor has discovered that a specific rubber composition intended in particular for a rubber article, in more particular for a tire sidewall, a tire tread, a shoe sole, a conveyor belt, a caterpillar track, in still more particular for a tire sidewall, which allows an unexpectedly improved tensile tear performance.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of more than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s), the product of the reaction of the various constituents used or both, some of the constituents being able or intended to react together, at least partly, during the various manufacturing phases of the composition, in particular during the vulcanization (curing).

SUMMARY OF INVENTION

Solution to Problem

A first aspect of the invention is a rubber composition based on at least an elastomer matrix, a carbon black, a silica, a silane coupling agent, and short fibers, wherein the elastomer matrix comprises at least one diene elastomer selected from the group consisting of a polyisoprene, a polybutadiene, a butadiene copolymer, an isoprene copolymer and combinations thereof, wherein the amount in phr of the silica is higher than that of the carbon black, wherein the amount of the silane coupling agent is more than 0.0% and less than 5.0%, that is between 0.0% and 5.0%, by weight per 100% by weight of the silica, and wherein the amount of the short fibers is more than 0.0 phr and less than 5.0 phr, that is between 0.0 and 5.0 phr, and wherein the number-average length of the short fibers is less than 10 mm.

Advantageous Effects of Invention

The specific rubber composition allows an unexpectedly improved tensile tear performance.

BRIEF DESCRIPTION OF DRAWINGS

FIG. 1 shows a diagram of tensile tear test.

DESCRIPTION OF EMBODIMENTS

Each of the below aspect(s), the embodiment(s), the instantiation(s), and the variant(s) including each of the preferred range(s), matter(s) or both may be applied to any one of the other aspect(s), the other embodiment(s), the other instantiation(s) and the other variant(s) of the invention unless expressly stated otherwise.

The rubber composition according to the invention is based on an elastomer matrix.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers hearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:
- (a)—any homopolymer obtained by polymerization of a conjugated diene monomer, preferably having from 4 to 12 carbon atoms;
- (b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The elastomer matrix in the rubber composition according to the invention comprises at least one diene elastomer selected from the group consisting of a polyisoprene, a polybutadiene, a butadiene copolymer, an isoprene copolymer and combinations thereof.

According to a preferred embodiment of the invention, the polybutadiene has a content (molar %) of 1,2-units of between 4% and 80% or has a content (molar %) of cis-1,4-units of more than 80%, more preferably more than 90% (molar %), still more preferably at least 96% (molar %).

According to a preferred embodiment of the invention, the polyisoprene is natural rubber (NR), a synthetic polyisoprene (IR) or combinations thereof. The synthetic polyisoprene may be a synthetic cis-1,4-polyisoprene, preferably having a content (molar %) of cis-1,4 bonds of more than 90%, more preferably more than 95%, still more preferably more than 98%.

According to a preferred embodiment of the invention, the butadiene copolymer is selected from the group consisting of styrene butadiene copolymers (SBR), butadiene isoprene copolymers (BIR), styrene butadiene isoprene copolymers (SBIR) and combinations thereof.

According to a preferred embodiment of the invention, the isoprene copolymer is selected from the group consisting of butadiene isoprene copolymers (BIR), styrene isoprene copolymers (SIR), styrene butadiene isoprene copolymers (SBIR) and combinations thereof.

A second aspect of the invention is the rubber composition according to the first aspect, wherein the elastomer matrix comprises more than 50 phr, preferably more than 60 phr, more preferably more than 70 phr, still more preferably more than 80 phr, particularly more than 90 phr, of at least one diene elastomer selected from the group consisting of a polybutadiene, a polyisoprene and combinations thereof, and optionally comprises less than 50 phr, preferably less than 40 phr, more preferably less than 30 phr, still more preferably less than 20 phr, particularly less than 10 phr, of at least one diene elastomer selected from the group consisting of a butadiene copolymer, an isoprene copolymer and combinations thereof.

A third aspect of the invention is the rubber composition according to the second aspect, wherein the elastomer matrix comprises more than 50 phr of a first diene elastomer which is a polybutadiene, and wherein the elastomer matrix comprises less than 50 phr of a second diene elastomer which is different from the first diene elastomer. A fourth aspect of the invention is the rubber composition according to the third aspect, wherein the second diene elastomer is a polyisoprene, more preferably natural rubber.

According to a preferred embodiment of the third or the fourth aspect, wherein the amount of the first diene elastomer is from 60 to 90 phr, and the amount of the second rubber composition is from 10 to 40 phr.

The rubber composition according to the invention is based on a carbon black.

As carbon blacks, all carbon blacks conventionally used in tires ("tire-grade" blacks) are suitable, such as for example reinforcing carbon blacks of the 100, 200 or 300 series in ASTM grades (such as for example, the N115. N134, N234, N326, N330, N339, N347 or N375 blacks), or carbon blacks higher series, the 500, 600, 700 or 800 series in ASTM grades (such as for example the N550, N660, N683, N772, N774 blacks). The carbon blacks might for example be already incorporated in an elastomer matrix, for instance, a diene elastomer, in the form of a masterbatch (see for example applications WO 97/36724 or WO 99/16600).

A fifth aspect of the invention is the rubber composition according to any one of the first to the fourth aspects, wherein the amount of the carbon black is less than 20 phr (for example, between 0.1 and 20 phr), preferably less than 15 phr (for example, between 0.4 and 15 phr), more preferably less than 10 phr (for example, between 0.7 and 10 phr), still more preferably at most 5.0 phr (for example, from 1.0 to 5.0 phr).

The rubber composition according to the invention is based on a silica ($SiO_2$).

According to an embodiment of the invention, the silica is a type of silica or blend of several silicas.

According to a preferred embodiment of the invention, the silica is any reinforcing silica, in particular any precipitated or pyrogenic silica having a BET surface area and a CTAB specific surface area that are both less than 450 $m^2/g$, preferably from 20 to 400 $m^2/g$, more preferably 50 to 350 $m^2/g$, still more preferably 100 to 300 $m^2/g$, particularly between 150 and 250 $m^2/g$. The BET surface area may be measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area may be determined according to the French standard NF T 45-007 of November 1987 (method B).

According to a preferred embodiment of the invention, the silica is formed from particles whose mean size by weight is less 1000 nm, preferably less 500 nm, more preferably less 200 nm, still more preferably between 20 nm and 200 nm. The mean size by weight may be measured in a well-known way after dispersion by ultrasound deagglomeration of the filler to be analyzed in water (or an aqueous solution containing a surfactant), for example by means of an X-ray detection centrifugal sedimentometer of XDC (X-ray disc centrifuge) type, sold by Brookhaven Instruments, according to the following procedure: 3.2 g of sample of inorganic filler to be analyzed are suspended in 40 ml of water by the action, over 8 minutes, at 60% power (60% of the maximum position of the "output control"), of a 1500 W ultrasonic probe (Vibracell ¾ inch sonicator sold by Bioblock); after sonication, 15 ml of the suspension are introduced into the rotating disc; after sedimentation for 120 minutes, the distribution by weight of the particle sizes and the weight-average size of the particles dw are calculated by the software of the XDC sedimentometer.

The amount in phr of the silica in the rubber composition according to the invention is higher than that of the carbon black.

According to a preferred embodiment of the invention, the amount of the silica is more than 200%, preferably more than 300%, more preferably more than 400%, still more preferably more than 400%, particularly more than 500%, more particularly more than 600%, still more particularly more than 700%, by weight per 100% by weight of the carbon black.

A sixth aspect of the invention is the rubber composition according to any one of the first to the fifth aspects, wherein the amount of the silica is at least 20 phr (for example, from 20 to 60 phr), preferably at least 25 phr (for example, from 25 to 55 phr), more preferably at least 30 phr (for example, from 30 to 50 phr), still more preferably at least 35 phr (for example, from 35 to 45 phr).

The rubber composition according to the invention is based on a silane coupling agent.

The silane coupling agent is intended to ensure sufficient chemical connection, physical connection or both between the silica and the elastomer matrix.

The silane coupling agent, by definition at least bifunctional, has the simplified general formula "Y-A-X", in which:
Y represents a functional group ("Y" function) which is capable of physically bonding, chemically bonding or both to the silica, such a bond being able to be es-tablished, for example, between a silicon atom of the silane coupling agent and the surface silanol groups of the silica;
X represents a functional group ("X" function) which is capable of physically bonding, chemically bonding or both to the elastomer matrix, for example via a sulfur atom;
A represents a divalent group allowing Y and X to be linked.

Bifunctional organosilanes or polyorganosiloxanes are customarily used, and most often silane polysulfides, referred to as "symmetrical" or "asymmetrical" depending on their specific structure, such as have been described in a great many patent documents (see, for example, WO 03/002648, WO03/002649 or WO 2004/033548).

As a reminder, the most often used are what are known as symmetrical silane polysulfides corresponding to the following general formula (I):

Z-A-Sx-A-Z (I)

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

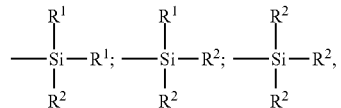
[Chem. 1]

in which:
the $R^1$ radicals which are substituted or unsubstituted, and identical to or different from one another, represent a $C_1$-$C_{18}$ alkyl group, $C_5$-$C_{18}$ cycloalkyl group or $C_6$-$C_{18}$ aryl group (preferably, $C_1$-$C_6$ alkyl, cyclohexyl or phenyl groups, in particular $C_1$-$C_4$ alkyl groups, more particularly methyl, ethyl or both),
the $R^2$ radicals which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulfides corresponding to the above formula (1), in particular normal commercially available mixtures, the mean value of the "x" indices is a fractional number preferably of between 2 and 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl)polysulfides (in particular disulfides, trisulfides or tetrasulfides), such as, for example, bis(3-trimelhoxysilylpropyl) or bis(3-triethoxysilylpropyl)polysulfides. Use is in particular made, among these compounds, of bis(3-triethoxysilylpropyl)tetrasulfide, abbreviated to TESPT, of formula $[(C_2H_5O)_3Si(CH_2)_3S_2]_2$, or bis(3-triethoxysilylpropyl)disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl)polysulfides (in particular disulfides, trisulfides or tetrasulfides), more particularly bis(monoethoxydimethylsilylpropyl)tetrasulfide, as described in patent application WO 02/083782 (or U.S. Pat. No. 7,217,751).

Mention will in particular be made, as coupling agent other than alkoxysilane polysulfide, of bifunctional POSs (polyorganosiloxanes) or of hydroxysilane polysulfides ($R^2$=OH in the above formula (I)), such as described in patent applications WO 02/30939 (or U.S. Pat. No. 6,774, 255) and WO 02/31041 (or US 2004/051210), or of silanes or POSs carrying azodicarbonyl functional groups, such as described, for example, in patent applications WO 2006/ 125532, WO 2006/125533 and WO 2006/125534.

As examples of other silane sulfides, mention will be made, for example, of the silanes bearing at least one thiol (—SH) function (referred to as mercaptosilanes), at least one blocked thiol function or both, such as described, for example, in patents or patent applications U.S. Pat. No. 6,849,754, WO 99/09036, WO 2006/023815, WO 2007/ 098080, WO 2008/055986 and WO 2010/072685.

Of course, use could also be made of mixtures of the silane coupling agents described previously, as described in particular in the aforementioned patent application WO 2006/125534.

The amount of the silane coupling agent in the rubber composition according to the invention is more than 0.0% and less than 5.0%, that is between 0.0% and 5.0%, by weight per 100% by weight of the silica.

A seventh aspect of the invention is the rubber composition according to any one of the first to the sixth aspects, wherein the amount of the silane coupling agent is from 1.0% to 4.0% by weight per 100% by weight of the silica.

According to a preferred embodiment of the invention, the amount of the silane coupling agent is between 0.0 and 3.0 phr, preferably from 1.0 to 2.0 phr.

The rubber composition according to the invention is based on short fibers.

The short fibers in the rubber composition according to the invention may be made of natural fibers, semi-synthetic fibers, synthetic fibers or combinations thereof.

Mention may be made, as examples of the natural fibers, of animal or plant fibers such as silk fibers, spider silk fibers, wool fibers, cotton fibers, hemp fibers and flax fibers.

Mention may be made, as examples of the semi-synthetic fibers, of rayon fibers such as modal fibers, acetate fibers, diacetate fibers, triacetate fibers and lyocell fibers.

Mention may be made, as examples of the synthetic fibers, of polymer fibers (such as polyvinyl alcohol (PVA) fibers, polyester fibers (for example, polyglycolic acid (PGA) fibers, polylactic acid (PLA) fibers, polycaprolactone (PCL) fibers, polyhydrox-yalkanoate (PHA) fibers, polyhydroxybutyrate (PHB) fibers, polyethylene adipate (PEA) fibers, polybutylene succinate (PBS) fibers, poly(3-hydroxybutyrate-co-3-hydroxyvalerate) (PHBV) fibers, polyethylene terephthalate (PET) fibers, polytrimethyleneterephtalate (PTT) fibers, poly-butyleneterephtalate (PBT) fibers, polyethylene naphthalate (PEN) fibers, polyethylene oxide (PEO) fibers, and polybutylene naphthalate (PBN) fibers), polyamide fibers (for example, nylon 4 fibers, nylon 11 fibers, nylon 12 fibers, nylon 66 fiber, nylon 610 fibers, nylon 6 T fibers, nylon 61 fibers, nylon 9 T fibers, nylon M5 T fibers, nylon 612 fibers, poly-p-phenyleneterephthalamide fibers and poly-m-phenyleneisophthalamide fibers), polyphenylenesulfide (PPS) fibers and polytetrafluoroethylene (PTFE) fibers and polyimide fibers), mineral fibers (such as carbon fibers and glass fiber) and metallic fibers.

An eighth aspect of the invention is the rubber composition according to any one of the first to the seventh aspects, wherein the short fibers are made of fibers selected from the group consisting of polyvinyl alcohol fibers, polyester fibers, polyamide fibers, cellulose fibers (for example, cotton fibers, wood, rayon fibers, viscose fibers) and combinations thereof, preferably wherein the short fibers are made of polyvinyl alcohol fibers, polyethylene terephthalate fibers, nylon 4 fibers, nylon 11 fibers, nylon 12 fibers, nylon 66 fiber, nylon 610 fibers, nylon 6 T fibers, nylon 61 fibers, nylon 9 T fibers, nylon M5 T fibers, nylon 612 fibers, poly-p-phenyleneterephthalamide fibers, poly-m-phenyleneisophthalamide fibers, cotton fibers, wood, rayon fibers, viscose fibers and combinations thereof.

The amount of the short fibers in the rubber composition according to the invention is more than 0.0 phr and less than 5.0 phr, that is between 0.0 and 5.0 phr.

A ninth aspect of the invention is the rubber composition according to any one of the first to the eighth aspects, wherein the amount of the short fibers is from 1.0 to 4.0 phr.

The number-average length of the short fibers in the rubber composition according to the invention is less than 10 mm, preferably at most 9.0 mm, more preferably less than 9.0 mm, still more preferably at most 8.0 mm, particularly less than 8.0 mm, more particularly at most 7.0 mm, still more particularly less than 7.0 mm, advantageously at most 6.0 mm, more advantageously less than 6.0 mm, still more advantageously at most 5.0 mm, especially less than 5.0 mm, more especially at most 4.0 mm.

The length of the short fibers may be determined by observing the short fibers with an optical microscope, and the number-average length of the short fibers may be obtained by the statistically sufficient observations (for example, at least 100 observations).

A tenth aspect of the invention is the rubber composition according to any one of the first to the ninth aspects, wherein the number-average length of the short fibers is at least 1.0 mm, preferably more than 1.0 mm, more preferably at least 2.0 mm, still more preferably more than 2.0 mm, particularly at least 3.0 mm, more particularly more than 3.0 mm, still more particularly at least 4.0 mm, for the balance between the tensile tear performance and the processability (for instance, reduce of number of chops on making the short fibers from the original fibers).

The short fibers may be made of monofilament yarns or multifilament yarns.

According to a preferred embodiment of the invention, the short fibers are made of multifilament yarns.

According to a more preferred embodiment of the preferred embodiment, the average number of the filaments in the multifilament yarns is between 1 and 10000, preferably between 10 and 8000, more preferably between 30 and 6000, still more preferably between 50 and 4000, particularly between 70 and 3000, more particularly between 90 and 2000, still more particularly from 100 to 1000.

According to a still more preferred embodiment of the preferred embodiment or the more preferred embodiment, the number-average diameter of the filament is between 1.0 and 100 μm, preferably between 5.0 and 50 μm, more preferably between 10 and 30 μm, still more preferably between 15 and 25 μm. The diameter and the average diameter of the short fibers may be determined and obtained by the same way as the above.

An eleventh aspect of the invention is the rubber composition according to any one of the first to the tenth aspects, wherein the amount in phr of the short fibers is lower than that of the carbon black, preferably wherein the amount of the short fibers is between 10% and 90%, more preferably between 20% and 80%, still more preferably between 30% and 70%, particularly between 40% and 60%, by weight per 100% by weight of the carbon black.

A twelfth aspect of the invention is the rubber composition according to any one of the first to the eleventh aspects, wherein the amount in phr of the short fibers is between 50% and 300%, preferably between 55% and 290%, more preferably between 60% and 280%, more preferably between 65% and 270%, still more preferably between 70% and 260%, particularly between 75 and 250%, by weight per 100% by weight of the silane coupling agent.

A thirteenth aspect of the invention is the rubber composition according to any one of the first to the twelfth aspects, wherein the short fibers are covered with glue, preferably resorcinol formaldehyde latex (RFL) glue. Such glue can enhance adhe-siveness of the short fibers to the elastomer matrix.

The rubber compositions according to the invention may be based on all or at least one portion of the usual additives generally used in the rubber compositions intended for rubber articles (for example, tires, shoes, belt conveyers or caterpillar tracks), such as, for example, protection agents, such as antiozone waxes, chemical antiozonants, antioxidants, plasticizing agents (for example, liquid plasticizers and hydrocarbon resins), tackifying resins, methylene acceptors (for example phenolic novolak resin), methylene donors (for example, hexamethylenetetramine (HMT), hexam-ethoxymethylmelamine (H3M) or combinations thereof), a crosslinking system (for examples, sulfur (sulphur), donors of sulfur, peroxide, bismaleimides, vulcanization accelerators, vulcanization activators or combinations thereof) or combinations thereof.

The rubber composition according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix, for instance, the diene elastomer(s), in a mixer, the carbon black, the silica, the silane coupling agent and the short fibers during a first stage ("non-productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), sulfur and the vulcanization accelerator in the crosslinking system; and kneading everything up to a maximum temperature of less than 110° C.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of sulfur and the vulcanization accelerator in the crosslinking system. The total kneading time, in this non-productive phase, is preferably between 1 and 15 min.

After cooling the mixture thus obtained, the crosslinking system may be then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulfur and on a primary vulcanization accelerator, in particular on an accelerator of sulfenamide type. Added to this vulcanization system are various known secondary accelerators or vulcanization activators, such as zinc oxide, stearic acid, guanidine derivatives (in particular diphenyl-guanidine), and the like, incorporated during the first non-productive phase and/or during the productive phase. The content of sulfur is preferably between 0.5 and 10.0 phr, more preferably between 0.5 and 3.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulfur, in particular accelerators of the thiazoles type and their derivatives, accelerators of thiurams types, or zinc dithiocarbamates. These accelerators are more preferably selected from the group consisting of 2-mercaptobenzothiazyl disulfide (abbreviated to "MBTS"), N-cy-clohexyl-2-benzothiazole sulfenamide (abbreviated to "CBS"), N,N-dicyclohexyl-2 benzothiazolesulphenamide ("DCBS"), N-tert-butyl-2-ben zothiazolesulfenamide ("TBBS"), N-tert-butyl-2 benzothiazolesulfenimide ("TBSI"), zinc dibenzyldithio-carbamate ("ZBEC"), Tetra-benzylthiuram disulfide ("TBZTD") and the combinations thereof.

The final composition thus obtained is subsequently calendered, for example in the form of a sheet or of a plaque, in particular for laboratory characterization, or else extruded in the form of a rubber profiled element which can be used directly as a rubber article, for example, a tire sidewall, a tire tread, a shoe sole and a caterpillar track tread.

The vulcanization (or curing) is carried out in a known way at a temperature generally of between 110° C. and 190° C. for a sufficient time which may vary, for example, between 5 and 90 min depending in particular on the curing temperature, the vulcanization system adopted and the vulcanization kinetics of the composition under consideration.

According to a preferred embodiment of the invention, an article comprises a rubber composition according to any one of the first to the thirteenth aspects.

According to a more preferred embodiment of the preferred embodiment, the article is a tire, a shoe, a conveyor or a caterpillar track, for example, a tire sidewall, a tire tread, a shoe sole, a conveyor belt and a caterpillar track tread.

A fourteenth aspect of the invention is a tire comprising a rubber composition according to any one of the first to the thirteenth aspects, preferably wherein the rubber composition is an external rubber composition.

The external rubber composition is intended to mean any rubber part of the tire which is open to the outside of the tire, in other words which is in contact with the air or with an inflating gas; for example, mention will be made of the tread, the sidewall(s) or else the airtight layer of the tire.

A fifteenth aspect of the invention is the tire according to fourteenth aspect, wherein the tire comprising a sidewall comprising a rubber composition to any one of the first to the thirteenth aspects.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

The invention relates to the rubber compositions in the raw state (i.e., before curing) and in the cured state (i.e., after crosslinking or vulcanization).

The invention is further illustrated by the following non-limiting examples.

EXAMPLE

In order to confirm the effect of the invention, eleven rubber compositions (identified as I-1 to I-4 (examples according to the invention), and W-1 to W-7 (a reference or comparative examples)) are compared for the tensile tear performance. The examples are based on an elastomer matrix that is blend of a polybutadiene rubber (BR) and natural rubber (NR); a blend of a carbon black with silica and a silane coupling agent; and short fibers.

Each rubber composition was produced as follows: The carbon black, the silica, the silane coupling agent, the short fibers, the elastomer matrix and the various other in-gredients, with the exception of sulfur and the vulcanization accelerator in the crosslinking system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulfur and an accelerator of sulfenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the mea-surement of their physical or mechanical properties, or in the form of profiled elements which could be used directly, after cutting and/or assembling to the desired di-mensions, for example as tire semi-finished products, in particular as tire sidewalls.

The tensile tear tests were carried out at 60° C. (cf. FIG. 1). Each of these test specimens was placed in the jaws of a machine of the INSTRON type and was stretched at 500 mm/min, and the transverse displacement and the stretching force were recorded until that each of these test specimens was ruptured.

The results (tensile tear performance) are expressed in base 100, that is to say that the value 100 is assigned to the tear energy index being equal to an integral of the transverse displacement with the stretching force of the reference (W-4), and the values of the rubber compositions are shown in Table 1. The higher the value is, the less susceptible is the material to tearing, which is to say that the higher tensile tear performance.

The results from Table 1 demonstrate that the rubber compositions (I-1 to I-4) according to the invention have an unexpectedly improved tensile tear performance than that of the reference or the comparative examples (W-1 to W-7).

In conclusion, the rubber composition according to the invention allows an improvement of the tensile tear performance.

TABLE 1

|  | I-1 | I-2 | I-3 | I-4 | W-1 | W-2 | W-3 | W-4 | W-5 | W-6 | W-7 |
|---|---|---|---|---|---|---|---|---|---|---|---|
| BR (1) | 65 | 65 | 65 | 65 | 65 | 65 | 65 | 65 | 65 | 65 | 65 |
| NR (2) | 35 | 35 | 35 | 35 | 35 | 35 | 35 | 35 | 35 | 35 | 35 |
| Carbon black (3) | 5.0 | 5.0 | 5.0 | 5.0 | 50 | 50 | 5.0 | 5.0 | 5.0 | 5.0 | 5.0 |
| Silica (4) | 40 | 40 | 40 | 40 |  |  | 40 | 40 | 40 | 40 | 40 |
| Silane coupling agent (5) | 1.6 | 1.6 | 1.6 | 1.6 |  |  | 1.6 |  | 2.4 | 1.6 | 1.6 |
| Short fibers 1 (6) | 2.5 |  |  |  |  |  |  |  |  |  |  |
| Short fibers 2 (7) |  | 1.3 | 2.5 | 3.8 |  | 2.5 |  | 2.5 | 2.5 | 5.0 |  |
| Short fibers 3 (8) |  |  |  |  |  |  |  |  |  |  | 2.5 |
| Liquid plasticizer (9) | 13 | 13 | 13 | 13 | 13 | 13 | 13 | 13 | 13 | 13 | 13 |
| Antioxidant (10) | 3.3 | 3.3 | 3.3 | 3.3 | 3.3 | 3.3 | 3.3 | 3.3 | 3.3 | 3.3 | 3.3 |
| Antiozone wax | 1.0 | 1.0 | 1.0 | 1.0 | 1.0 | 1.0 | 1.0 | 1.0 | 1.0 | 1.0 | 1.0 |
| DPG (11) | 0.8 | 0.8 | 0.8 | 0.8 |  |  | 0.8 | 0.8 | 0.8 | 0.8 | 0.8 |
| Stearic acid | 1.0 | 1.0 | 1.0 | 1.0 | 1.0 | 1.0 | 1.0 | 1.0 | 1.0 | 1.0 | 1.0 |
| Zinc oxide | 3.0 | 3.0 | 3.0 | 3.0 | 3.0 | 3.0 | 3.0 | 3.0 | 3.0 | 3.0 | 3.0 |
| Sulfur | 1.9 | 1.9 | 1.9 | 1.9 | 1.9 | 1.9 | 1.9 | 1.9 | 1.9 | 1.9 | 1.9 |
| Vulcanization accelerator (12) | 1.1 | 1.1 | 1.1 | 1.1 | 1.1 | 1.1 | 1.1 | 1.1 | 1.1 | 1.1 | 1.1 |
| Tensile tear performance | 127 | 113 | 112 | 121 | 48 | 34 | 84 | 100 | 68 | 33 | 100 |

(1) BR with 0.3% of 1,2 vinyl; 2.7% of trans; 97% of cis-1,4 (Tg$_{DSC}$ = −105° C.);
(2) Technical Specified Rubber 20;
(3) Carbon black (ASTM grade N550 from Cabot);
(4) Silica ("Zeosil 1165MP" from Rhodia (CTAB, BET: about 160 m$^2$/g));
(5) Silane coupling agent TESPT ("Si69" from Evonik);
(6) Short fiber 1 (polyvinyl alcohol short fiber, "Kuralon 1239" from Kuraray, thickness 1330 dtex, covered with resorcinol formaldehyde latex glue, and chopped with a number-average length (4.0 mm));
(7) Short fiber 2 (polyvinyl alcohol short fiber, "Kuralon 1239" from Kuraray, thickness 1330 dtex, covered with resorcinol formaldehyde latex glue, and chopped with a number-average length (6.0 mm));
(8) Short fiber 3 (polyvinyl alcohol short fiber, "Kuralon 1239" from Kuraray, thickness 1330 dtex, covered with resorcinol formaldehyde latex glue, and chopped with a number-average length (10 mm));
(9) MES oil ("Catenex SNR" from Shell);
(10) Combination of N-(1,3-dimethylbutyl)-N-phenyl-para-phenylenediamine ("Santoflex 6-PPD" from Flexsys) and 2,2,4-trimethyl-1,2-dihydroquinolone ("TMQ" from Lanxess);
(11) Diphenylguanidine ("Perkacit DPG" from Flexsys);
(12) N-dicyclohexyl-2-benzothiazolesulfenamide ("Santocure CBS" from Flexsys).

The invention claimed is:

1. A rubber composition based on at least:
an elastomer matrix comprising:
60 phr to 90 phr of a polybutadiene; and
10 phr to 40 phr of a polyisoprene;
a carbon black;
a silica;
a silane coupling agent; and
short fibers,
wherein an amount in phr of the silica is higher than an amount of the carbon black,
wherein an amount of the silane coupling agent is more than 0.0% and less than 5.0% by weight per 100% by weight of the silica,
wherein an amount of the short fibers is more than 0.0 phr and less than 5.0 phr, and
wherein the number-average length of the short fibers is less than 10 mm.

2. The rubber composition according to claim 1, wherein the amount of the carbon black is less than 20 phr.

3. The rubber composition according to claim 1, wherein the amount of the silica is at least 20 phr.

4. The rubber composition according to claim 1, wherein the amount of the silane coupling agent is from 1.0% to 4.0%, by weight per 100% by weight of the silica.

5. The rubber composition according to claim 1, wherein the short fibers are made of fibers selected from the group consisting of polyvinyl alcohol fibers, polyester fibers, polyamide fibers, cellulose fibers and combinations thereof.

6. The rubber composition according to claim 1, wherein the amount of the short fibers is from 1.0 to 4.0 phr.

7. The rubber composition according to claim 1, wherein the number-average length of the short fibers is at least 1.0 mm.

8. The rubber composition according to claim 1, wherein the amount in phr of the short fibers is lower than that of the carbon black.

9. The rubber composition according to claim 1, wherein the amount in phr of the short fibers is between 50% and 300% by weight per 100% by weight of the silane coupling agent.

10. The rubber composition according to claim 1, wherein the short fibers are covered with glue.

11. A tire comprising the rubber composition according to claim 1.

12. The tire according to claim 11, wherein the tire comprises a sidewall comprising the rubber composition.

* * * * *